US006907794B2

(12) United States Patent
Arai

(10) Patent No.: US 6,907,794 B2
(45) Date of Patent: Jun. 21, 2005

(54) TORQUE MEASURING APPARATUS FOR ROTATING BODY

(75) Inventor: Tooru Arai, Kanagawa-ken (JP)

(73) Assignee: Minebea Co., Ltd., Nagano-ken (JP)

( * ) Notice: Subject to any disclaimer, the term of this patent is extended or adjusted under 35 U.S.C. 154(b) by 0 days.

(21) Appl. No.: 10/805,950

(22) Filed: Mar. 22, 2004

(65) Prior Publication Data

US 2004/0187604 A1 Sep. 30, 2004

(30) Foreign Application Priority Data

Mar. 28, 2003 (JP) ....................................... 2003-091400

(51) Int. Cl.[7] .................................................. G01L 3/02
(52) U.S. Cl. ..................................... 73/862.324; 73/862
(58) Field of Search .............. 73/862, 862.324–862.326

(56) References Cited

U.S. PATENT DOCUMENTS 4,459,759 A * 7/1984 Hulsing, II .............. 73/514.39
4,992,826 A * 2/1991 Nakabayashi ................ 355/84
5,369,322 A * 11/1994 Maruyama et al. ........... 310/39
5,369,583 A * 11/1994 Hazelden ............... 73/862.324
5,632,546 A * 5/1997 Lee ............................ 353/122
6,504,275 B2 * 1/2003 Nondahl et al. .......... 310/68 B

FOREIGN PATENT DOCUMENTS

EP 1 170 577 1/2002
JP 2002-022566 1/2002

OTHER PUBLICATIONS

Patent Abstracts of Japan, vol. 0110, No. 87 (P–557), Mar. 17, 1987 & JP 61 240219 A (Hitachi Ltd.), Oct. 25, 1986.

* cited by examiner

*Primary Examiner*—Max Noori
*Assistant Examiner*—Alandra Ellington
(74) *Attorney, Agent, or Firm*—Fay, Sharpe, Fagan, Minnich & McKee, LLP

(57) ABSTRACT

A torque measuring apparatus includes a rotor having a hollow body portion formed between a drive-side flange portion and a load-side flange portion. Light emitting elements are disposed on a periphery of the rotor, for emitting optical signals based on an output from a torque detection unit attached to a hollow portion of the hollow body portion. A transparent plate attached to a chassis is disposed outside the rotor, for allowing the optical signals to pass therethrough, and a signal receiving unit is arranged on the chassis, for receiving the optical signals via the transparent plate, wherein the transparent plate is detachable from the chassis.

4 Claims, 6 Drawing Sheets

10 16 16a 16b 16T 27n 27a 14 18a 18b 41 43 L 17 32b 32a 33a 31 33b

TORQUE MEASURING APPARATUS FOR ROTATING BODY

BACKGROUND OF THE INVENTION

1. Field of the Invention

The present invention relates to a torque measuring apparatus for which cleaning operations can easily be performed for removing oil mist or the like attached onto signal receiving units adapted to receive optical signals from a rotor.

2. Description of the Related Art

A torque measuring apparatus is arranged between a rotating shaft at a drive end and a rotating shaft at a load end to measure rotational torque without contact with these shafts. In one application, the torque measuring apparatus is used to measure rotational torque between a measuring roller and a brake mechanism in a chassis dynamo adopted to be rotated by the wheel of an automobile (see, e.g., Japanese Patent Application Laid-Open No. 2002-22566).

FIG. 1 is a front view of a conventional torque measuring apparatus, while FIG. 2 is a partial cross sectional side view of the conventional torque measuring apparatus.

As shown in FIGS. 1 and 2, a conventional torque measuring apparatus 50 is constructed from a rotor 51 arranged between a drive-side shaft 91 and a load-side shaft 93, and a fixed body 55 fixed to the outside of the rotor 51, and is attached between the drive-side shaft 91 and the load-side shaft 93. The rotor 51 is integrated with a drive-side flange portion 52 attached to a flange 92 of the drive-side shaft 91, a load-side flange portion 54 attached to the flange 94 of the load-side shaft 93, and a hollow body portion 53 between the drive-side flange portion 52 and the load-side flange portion 54, and the fixed body 55 is constructed from an annular portion 56 provided on the outside of the load-side flange portion 54 and a chassis 57 to which the annular portion 56 is fixed via a fixture portion 58.

A primary coil 87 is provided in the annular portion 56 arranged on the outside of the load-side flange portion 54, and a secondary coil 88 is provided around the outer periphery of the load-side flange portion 54, the primary coil 87 and secondary coil 88 forming a rotary transformer 89 to supply power to the rotor 51.

In a hollow portion 59 of the hollow body portion 53, a strain gauge torque detection unit 61 is provided, a plurality of light emitting elements 67*a* to 67*n* for emitting light or optical signals based on the output from a torque detection unit 61 are provided around the outer periphery of the load-side flange portion 54, an optical fiber 31 for receiving the optical signals from the light emitting elements 67*a* to 67*n* is arranged alongside the primary coil 87 in the annular portion 56, and at the end portion of the optical fiber 71 an optical signal conversion unit (not shown) for conversion to electrical signals is provided.

Consequently, the torque measuring apparatus 50, when the drive-side shaft 91 rotates and drives, detects the output from the torque detection unit 61 via the light emitting elements 67*a* to 67*n* and the optical fiber 31, by means of the optical signal conversion unit, whereby the rotational torque is detected.

As described above, although the conventional torque measuring apparatus 50 is interposed between the drive-side shaft 91 and the load-side shaft 93 and can measure torque without being in contact with its rotating portion, the torque measuring apparatus are installed in many cases in the environment in which oil mist or the like is generated.

As a result, the oil mist or the like attached onto the light receiving fiber 71 as a light receiving portion may cause damage to measuring precision and abnormal conditions such as impossibility of measurement, so that the light receiving fiber 71 must be cleaned. However, the cleaning operation is rather difficult because the light receiving optical fiber 31 is arranged inside the annular portion 56, leading to a demand for improvement in the cleaning operation.

SUMMARY OF THE INVENTION

The present invention was conceived in light of the above problem of the prior art, and it is therefore an object of the present invention to provide a torque measuring apparatus for which cleaning operations on the light receiving portions for receiving optical signals from the rotor is easy.

In order to attain the above object, according to a major aspect of the present invention there is provided a torque measuring apparatus comprising a rotor having a hollow body portion formed between a drive-side flange portion and a load-side flange portion; light emitting elements disposed on a periphery of the rotor, for emitting optical signals based on an output from a torque detection unit attached to a hollow portion of the hollow body portion; a transparent plate attached to a chassis disposed outside the rotor, for allowing the optical signals to pass therethrough; and a signal receiving unit arranged on the chassis, for receiving the optical signals via the transparent plate, wherein the transparent plate is detachable from the chassis.

Preferably, the torque measuring apparatus of the present invention may comprise a slide mechanism for sliding the transparent plate by manual operation. The torque measuring apparatus may further comprise a motor driven slide mechanism for sliding the transparent plate by operation of an operating switch. When abnormal contamination is detected on the transparent plate, the transparent plate may be slidable by means of the motor driven slide mechanism.

BRIEF DESCRIPTION OF THE DRAWINGS

These and other objects, features, aspects and advantages of the present invention will become better understood with reference to the following description, appended claims and accompanying drawings, in which:

DETAILED DESCRIPTION OF THE PREFERRED EMBODIMENT

The preferred embodiments of the present invention will be described hereinbelow.

Figure 1:
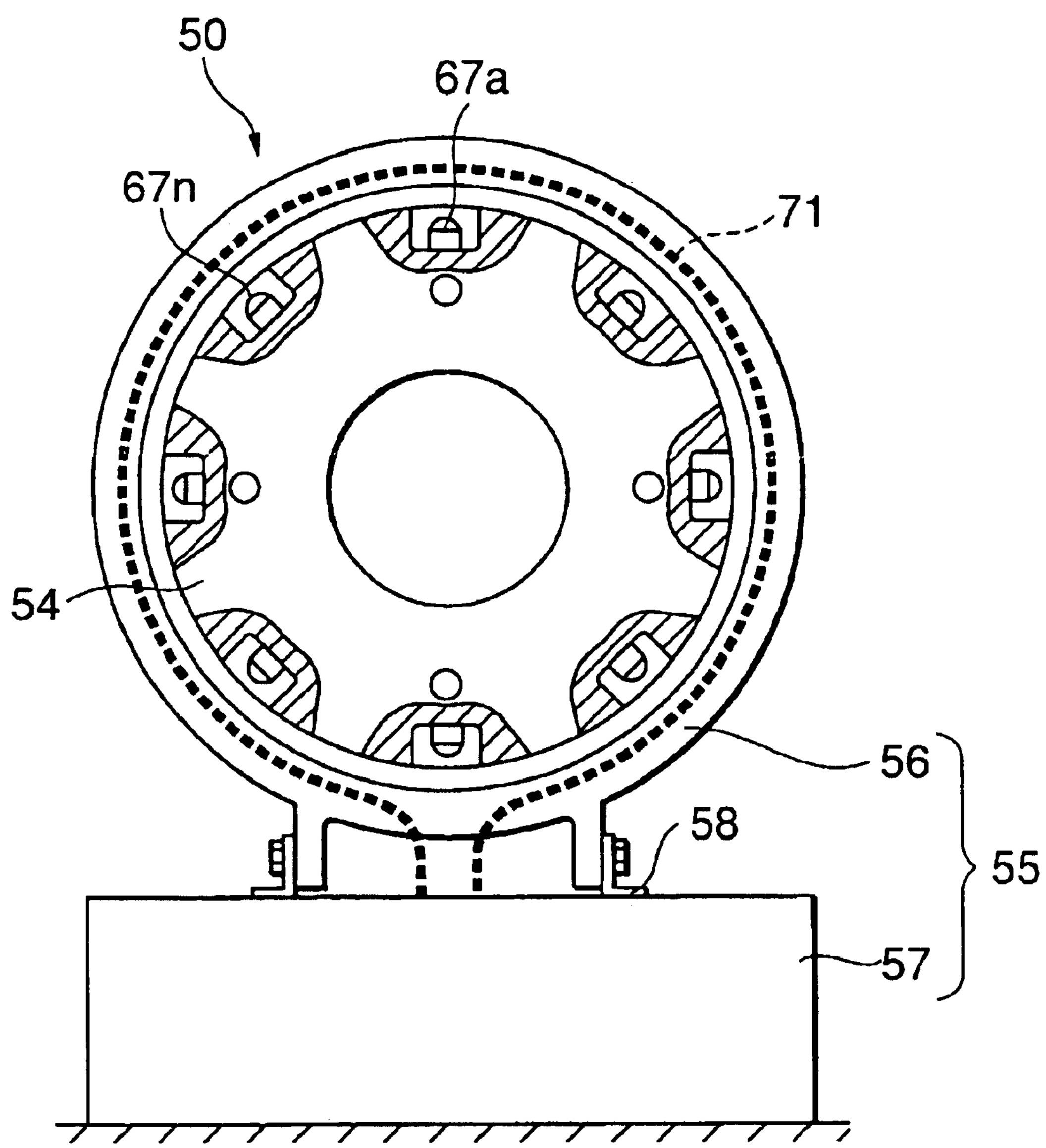
FIG. 1 is a front view of a conventional measuring apparatus.
Figure 2:
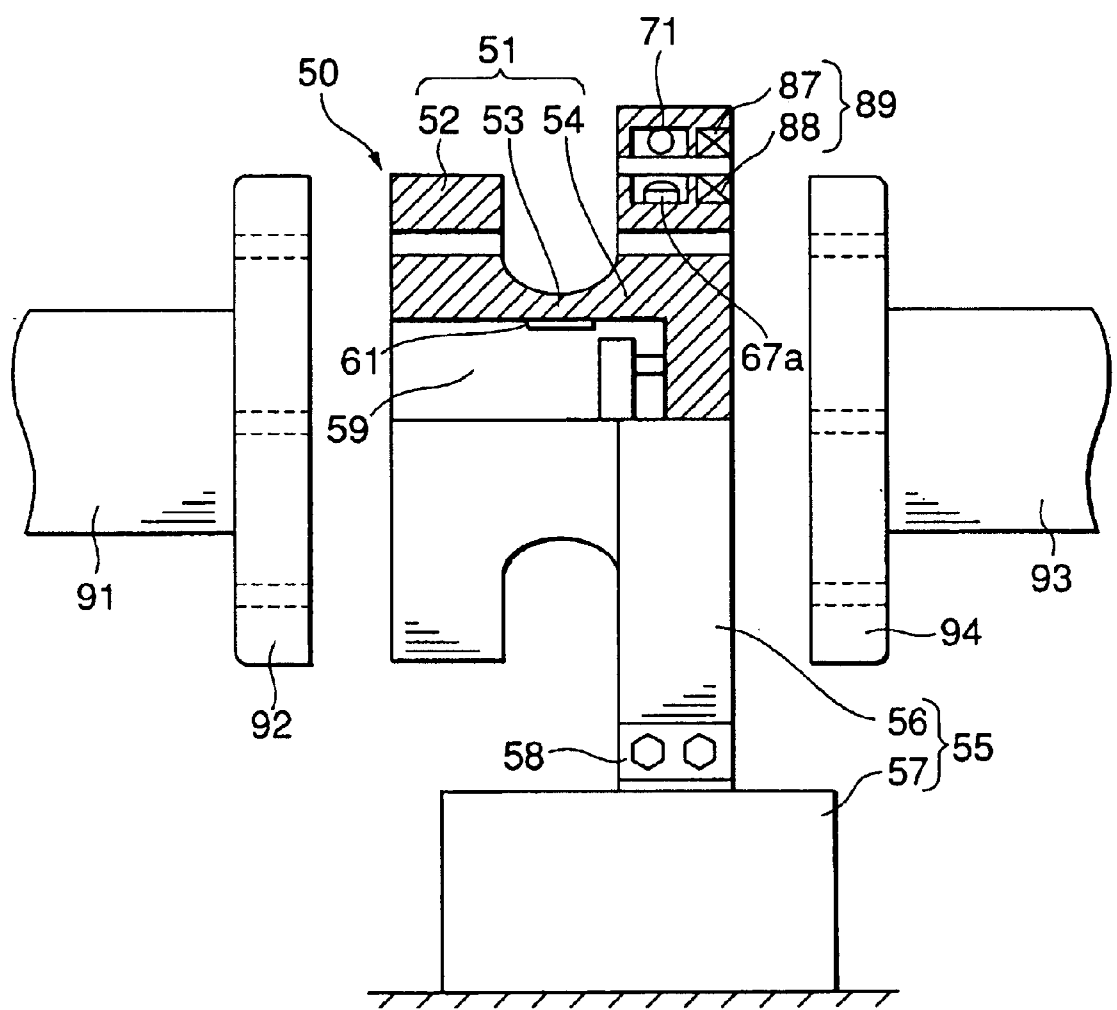
FIG. 2 is a partial cross sectional side view of the conventional torque measuring apparatus.
Figure 3:
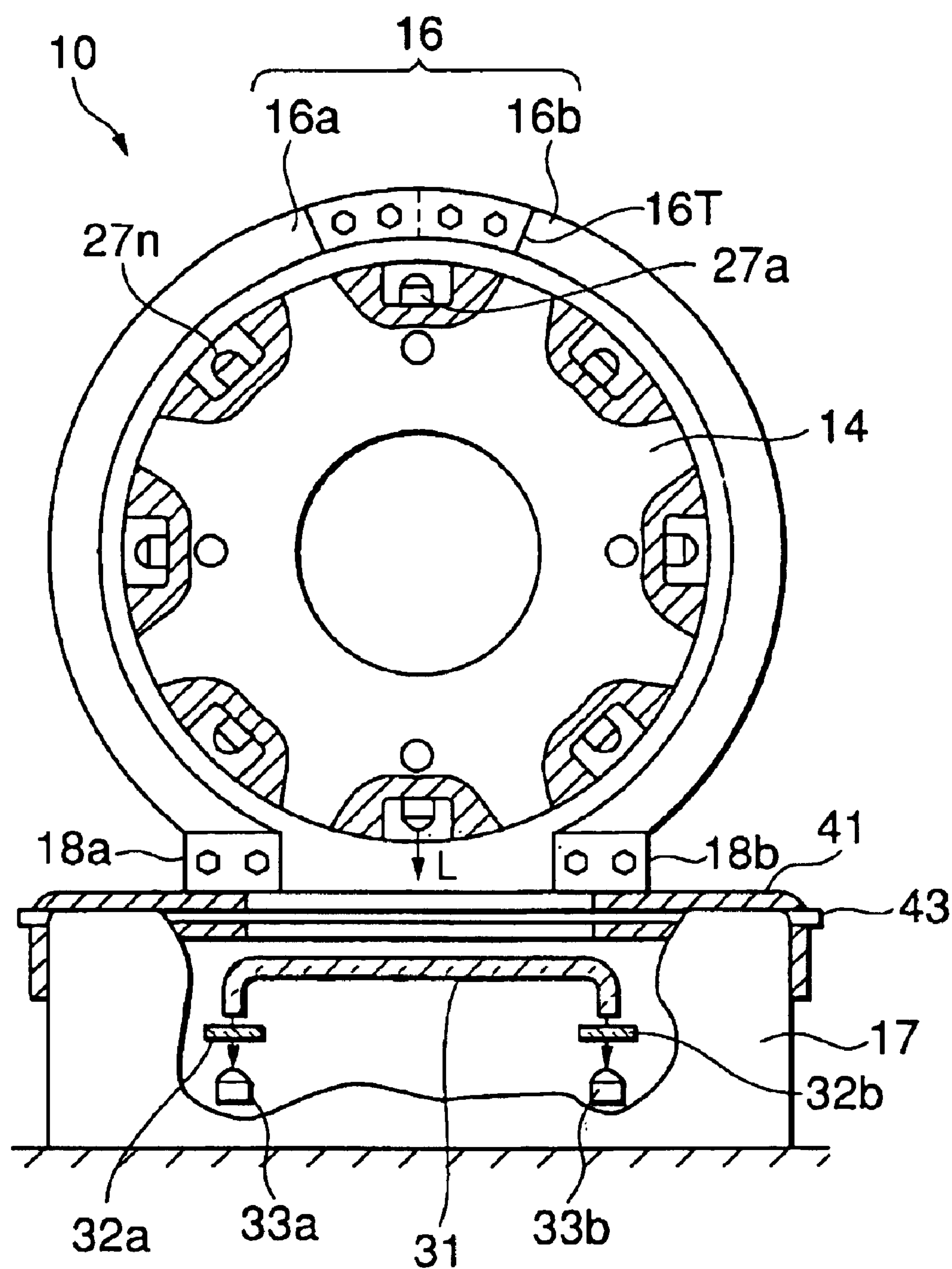
FIG. 3 is a front view of a torque measuring apparatus according to an embodiment of the present invention.
Figure 4:
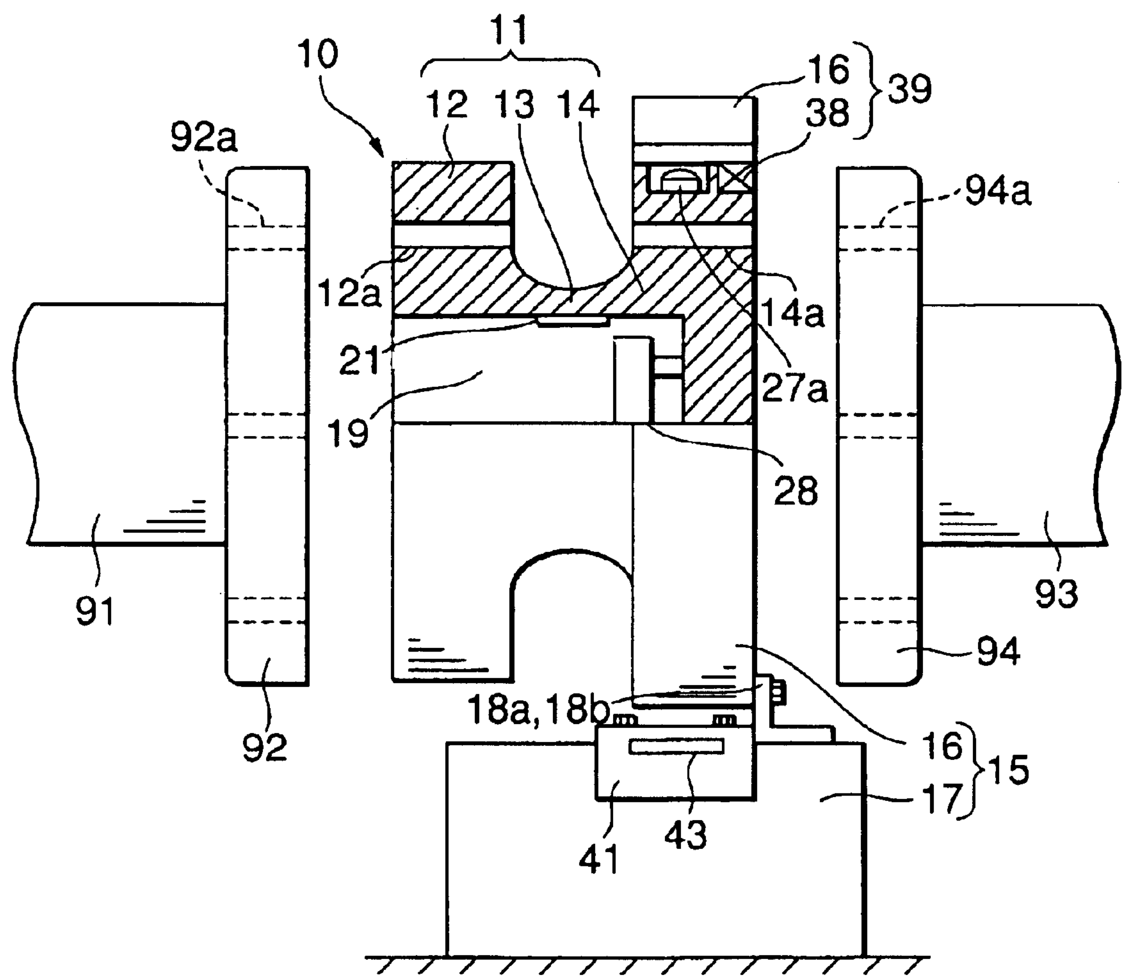
FIG. 4 is a partially cut-away side view of the torque measuring apparatus according to the embodiment of the present invention.

FIG. 3 is a front view of a torque measuring apparatus according to an embodiment of the present invention, and FIG. 4 is a partially cut-away side view of the torque measuring apparatus shown in FIG. 3.

As shown in FIGS. 3 and 4, a torque measuring apparatus 10 of the embodiment of the present invention is composed of a rotor 11 arranged between a drive-side shaft 91 and a load-side shaft 93, and a fixed body 15 fixed to the outside of the rotor 11, and is disposed between the drive-side shaft 91 and the load-side shaft 93. The rotor 11 is integrated with a drive-side flange portion 12 attached to a flange 92 of the drive-side shaft 91, a load-side flange portion 14 attached to a flange 94 of the load-side shaft 93, and a hollow body portion 13 between the drive-side flange portion 12 and the load-side flange portion 14. The fixed body 15 is constructed from a half structured annular portion 16 provided on the outside of the load-side flange portion 14 and a chassis 17 to which the half structured annular portion 16 is fixed.

The drive-side flange portion 12 is fixed to the flange 92 by a screw (not shown) passing through a threaded hole 12*a* in the drive-side flange portion 12 and an attachment hole 92*a* in the flange 92. Also, the load-side flange portion 14 is fixed to the flange 94 by a screw (not shown) passing through a threaded hole 14*a* in the drive-side flange portion 14 and an attachment hole 94*a* in the flange 94. The hollow body portion 13 is twisted by the drive-side flange portion 12 and the load-side flange portion 14 to form a strain-causing body.

The half structured annular portion 16 has semi-annular portions 16*a* and 16*b* whose upper ends are both connected by a conductive connecting member 16T, the lower ends of the semi-annular portions 16*a* and 16*b* being fixed in an insulated state to fixture members 18*a* and 18*b* mounted on the chassis 17. That is, because the half structured annular portion 16 is of a discontinuous annular shape notched at its lower end, and fixed in an insulated state, the half structured annular portion 16 can serve as a primary coil and can be easily attached or detached. This primary coil forms a rotary transformer 39 together with a secondary coil 38 provided on the outer periphery of the load-side flange portion 14, and can supply electric power to the rotor 11.

In a hollow portion 19 of the hollow body portion 13 is provided a strain gauge torque detection unit 21, and a plurality of light emitting elements 27*a* to 27*n* are provided along the outer periphery of the load-side flange portion 14 for emitting light in response to the output of the torque detection unit 21 and transmitting an optical signal L. In the chassis 17, an optical fiber 31, for receiving optical signals from the light emitting elements 27*a* to 27*n*, is arranged in a linear shape with both end portions bent into L shapes so that it can be compactly housed inside the chassis 17. Also, in the chassis 17 on its upper surface is attached a transparent plate 43 that allows the optical signal to pass through, and the transparent plate 43 serves to prevent oil mist, dust or the like from entering to the interior of the chassis 17 and protect the light receiving fiber 31. A protective cover 41 for protecting the transparent plate 43 is attached to the chassis 17, and the transparent plate 43 is detachably mounted on the protective cover 41.

Facing the end surfaces of the optical fiber 31, optical signal conversion units 33*a* and 33*b* for receiving optical signals via optical high pass filters 32*a* and 32*b* and converting them to electrical signals are provided. Electrical components of the rotor 11 are mounted on a mounting base plate 28.

Figure 5:
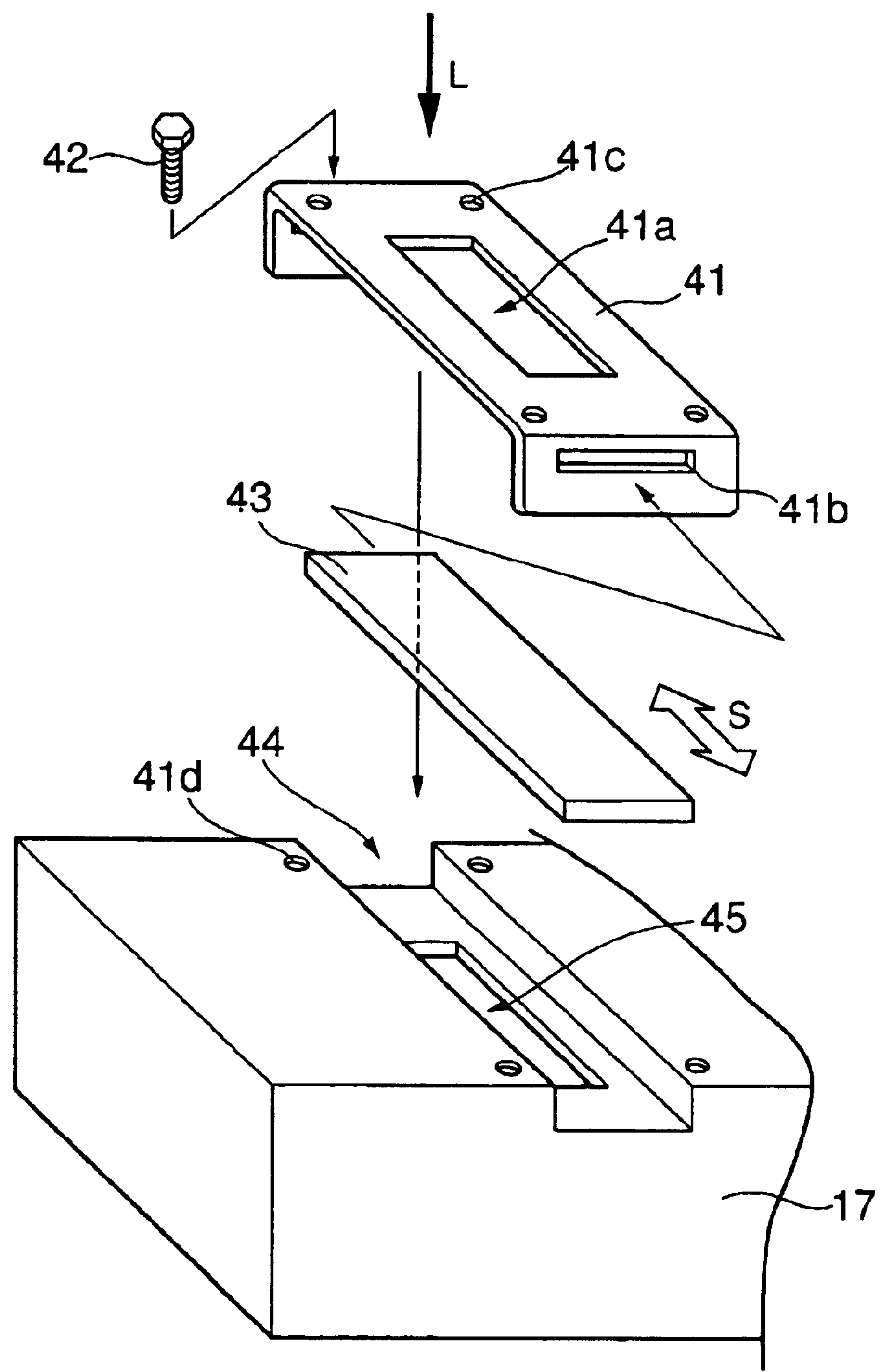
FIG. 5 is an exploded perspective view showing a transparent plate being attached to a chassis by means of a protective cover.

FIG. 5 shows the transparent plate being attached to the chassis 17 by means of the protective cover 41.

As shown in FIG. 5, the protective cover 41 has a light conducting opening 41*a* for allowing the optical signal L to pass onto its upper surface, and holes 41*b* for insertion of the transparent plate 43 opened on its left and right side surfaces. The protective cover 41 is fixed to the chassis 17 by threading screws 42 through holes 41*c* into threaded holes 41*d*. A channel 44 is formed in the chassis 17 and the transparent plate 43 can be inserted from the insertion holes 41*b* into the protective cover 41 attached to the chassis 17. The transparent plate 43 is slid and detached as indicated by an arrow S so that the oil mist or the like attached on the transparent plate 43 can be cleaned off. A light conducting hole 45 is provided in the chassis 17, and the optical signal L passing through the light conducting opening 41*a* passes through the transparent plate 43 and the light conducting hole 45, and is incident on the optical fiber 31 arranged inside the chassis 17 as shown in FIG. 3.

Figure 6A:
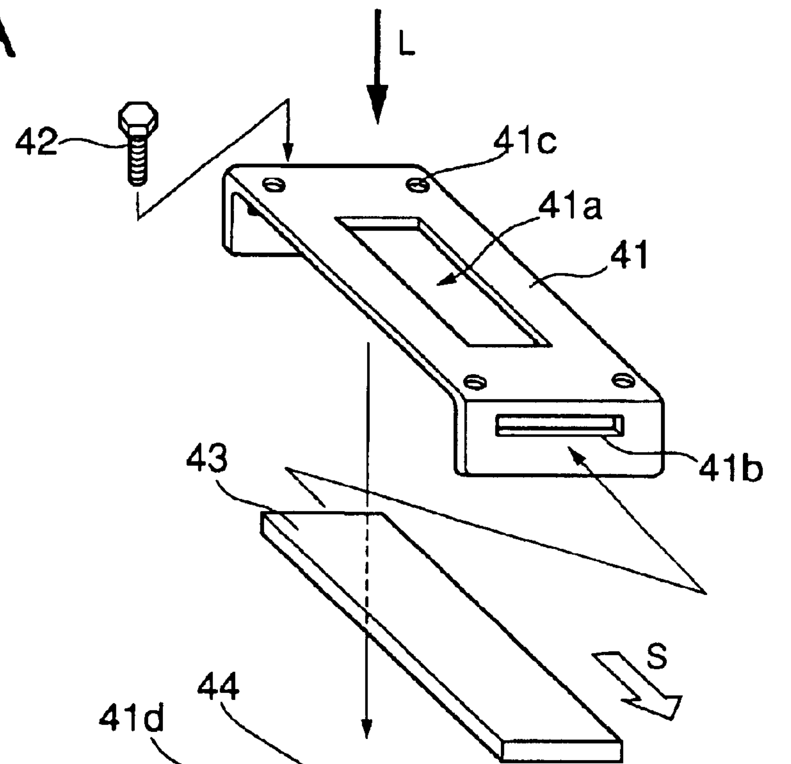
FIG. 6A is an exploded perspective view showing a transparent plate being attached to a chassis by means of a protective cover and being slidable by means of a sliding mechanism.
Figure 6A:
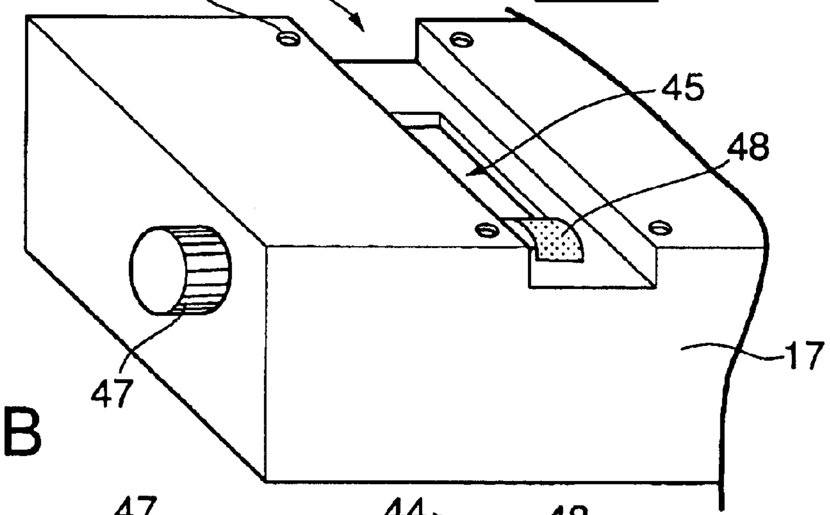
Figure 6B:
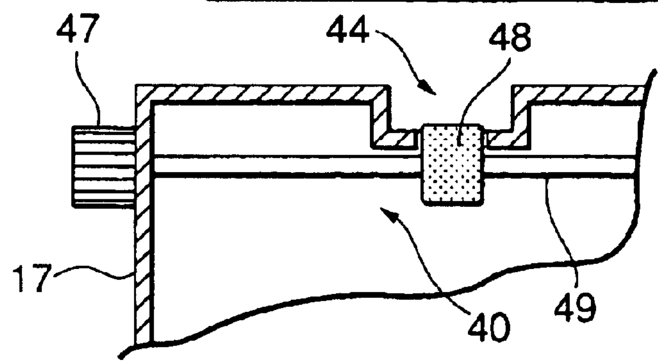
FIG. 6B is a cross sectional view of the sliding mechanism.

FIG. 6A is an exploded perspective view showing a sliding mechanism provided in the chassis and FIG. 6B is a cross sectional view of the sliding mechanism.

As shown in FIG. 6B, a sliding mechanism 40 is arranged inside the chassis 17. The sliding mechanism 40 has an operating knob 47 and a roller 48 attached to a shaft 49, which is rotated by the operating knob 47, when the transparent plate 43 is inserted through the insertion hole 41*b* into the channel 44, comes into contact with the roller 48. The transparent plate 43 can be slid in the channel 44 and detached as indicated by the arrow S by rotating the operating knob 47 so that the oil mist or the like which is on the transparent plate 43 can be cleaned off. The optical signal L passing through the light conducting hole 41*a* passes through the transparent plate 43 and the light conducting hole 45, and is incident on the optical fiber 31 arranged inside the chassis 17.

The slide mechanism 40 can be driven by a motor (not shown) to rotate the shaft 49 so that the transparent plate 43 can be slid and detached to clean off the oil mist or the like thereon.

Contaminants on the transparent plate 43 can be detected in terms of a level of the optical signal passing through the transparent plate 43, and the oil mist or the like on the transparent plate 43 can automatically be cleaned off by sliding the transparent plate 43 by means of the motor provided in the slide mechanism 40 on the basis of the contaminant level thus detected.

Further, a thin film may be applied to the surface of the transparent plate 43 and by peeling off this film, the oil mist or the like on the transparent plate 43 can be cleaned off.

Next, the operation of the torque measuring apparatus according to the embodiment of the present invention will be described.

As shown in FIG. 4, strain gauges are affixed on the hollow portion 19 of the hollow body portion 13 of the strain-causing body along the circumferential direction, and the strain gauges constitute a part of a Wheatstone bridge to form the torque detection unit 21. An analog output from the torque detection unit 21 is converted to the optical signal L by the light emitting elements 27*a* to 27*n* which in turn is transmitted.

In the fixed body 15, the optical signal L from the light emitting elements 27*a* to 27*n* via the transparent plate 43 is received by the optical fiber 31 after being diffused by a diffusion plate 34, and the received optical signal L transmits in the optical fiber 31 in the left and right directions. The optical high pass filters 32*a* and 32*b* remove incidental light caused by fluorescent lamps or the like, and torque detection is performed by converting the optical signal to a torque signal which is an electrical signal by means of the optical signal conversion units 33*a* and 33*b*. The transparent plate 43 is slidable and detachable, and therefore the oil mist or the like attached to the transparent plate 43 can be cleaned off by taking out the transparent plate 43.

In the fixed body 15, an electric power of a given frequency is generated and is transmitted to the rotor side via the rotary transformer 39. Then the electric power is converted to direct current and supplied to the rotor 11.

As described above, according to the torque measuring apparatus 10 of the first embodiment of the present invention, when the drive-side shaft 91 is driven, the output from the torque detection unit 21 is converted to the optical signal L by the light emitting elements 27*a* to 27*n* which is transmitted whereby measurement of the rotational torque is performed.

The optical fiber 31 that receives the optical signal L is installed inside the chassis 17, and the transparent plate 43 is detachably installed on the optical signal receiving side of the chassis 17 whereby the oil mist or the like on the transparent palate 43 can be easily cleaned off.

Although the torque measuring apparatus of the embodiment of the present invention has been explained in a case where the single optical fiber 31 is used, more than one optical fibers may be used in combination with one or more optical signal conversion units at both ends of these fibers to receive optical signals.

In the torque measuring apparatus according to this embodiment of the present invention, the number of light emitting elements 27*a* to 27*n* is set so that the optical fiber 31 can continuously receive optical signals from any one of the plurality of light emitting elements 27*a* to 27*n*, rotational torque can be measured even when the shafts of the driven-side flange portion 12 and the load-side flange portion 14 are stopped or rotating at a low speed.

A torque measuring apparatus of the present invention comprises a rotor having a hollow body portion formed between a drive-side flange portion and a load-side flange portion; light emitting elements disposed on a periphery of the rotor for emitting optical signals based on an output from a torque detection unit arranged on a hollow portion of the hollow body portion; a transparent plate attached to a chassis disposed outside the rotor for allowing the optical signals to pass therethrough; and a signal receiving unit attached to the chassis for receiving the optical signals via the transparent plate, the transparent plate being detachable from the chassis. Removal and cleaning of oil mist or the like attached to the transparent plate can be easily performed and the cleaning operation for light receiving portions can be easily performed.

The torque measuring apparatus may have the slide mechanism for sliding the transparent plate by manual operation and therefore, the transparent plate can be easily detached so that oil mist or the like attached to the transparent plate can be easily cleaned off.

Further, the torque measuring apparatus may have a motor driven slide mechanism that slides the transparent plate by the operation of an operating switch, and therefore the transparent plate can be simply detached so that oil mist or the like attached to the transparent plate can be easily cleaned off.

Furthermore, the transparent plate may be slid by the motor driven slide mechanism when undesired contamination is detected on the transparent plate, and therefore oil mist and the like attached to the transparent plate can be cleaned off at an appropriate time.

While preferred embodiment of the present invention has been described in detail for illustrative purpose herein, it is to be understood that the inventive concepts may be otherwise variously embodied and employed and that the appended claims are intended to be construed to include such variations except insofar as limited by the prior art.

What is claimed is:

1. A torque measuring apparatus comprising:

a rotor having a hollow body portion formed between a drive-side flange portion and a load-side flange portion;

light emitting elements disposed on a periphery of the rotor, for emitting optical signals based on an output from a torque detection unit arranged on a hollow portion of the hollow body portion;

a transparent plate attached to a chassis disposed outside the rotor, for allowing the optical signals to pass therethrough;

a signal receiving unit attached to the chassis, for receiving the optical signals via the transparent plate, wherein the transparent plate is detachable from the chassis; and a slide mechanism for sliding the transparent plate.

2. The torque measuring apparatus according to claim 1, wherein the slide mechanism comprises a manually operated element.

3. The torque measuring apparatus according to claim 1, wherein the slide mechanism comprises a motor for sliding the transparent plate by operation of an operating switch.

4. The torque measuring apparatus according to claim 3, wherein the transparent plate is caused to slide by means of the motor driven slide mechanism when contamination is detected on the transparent plate.

* * * * *